United States Patent
Huang

(10) Patent No.: US 7,353,562 B2
(45) Date of Patent: Apr. 8, 2008

(54) JOINT APPARATUS OF A CAR WINDSHIELD WIPER ARM

(76) Inventor: Shih-Hsien Huang, 7F.-2, No.37, Jhengsin St., Zuoying District, Kaohsiung City 813 (TW)

( * ) Notice: Subject to any disclaimer, the term of this patent is extended or adjusted under 35 U.S.C. 154(b) by 0 days.

(21) Appl. No.: 11/525,831

(22) Filed: Sep. 25, 2006

(65) Prior Publication Data
US 2007/0067940 A1    Mar. 29, 2007

(30) Foreign Application Priority Data
Sep. 25, 2005    (TW) .............................. 94216656 U

(51) Int. Cl.
*B60S 1/40*    (2006.01)
(52) U.S. Cl. ................. 15/250.32; 15/250.43
(58) Field of Classification Search ............. 15/250.32, 15/250.43, 250.44, 250.361
See application file for complete search history.

(56) References Cited

U.S. PATENT DOCUMENTS

| | | | |
|---|---|---|---|
| 6,687,948 B2 | 2/2004 | Kotlarski | 15/250.32 |
| 6,782,581 B2 | 8/2004 | Block | 15/250.32 |
| 6,836,926 B1 | 1/2005 | De Block | 15/250.47 |
| 6,836,927 B2 | 1/2005 | De Block et al. | 15/250.47 |
| 6,910,244 B2 | 6/2005 | De Block et al. | 15/250.32 |
| 2004/0025380 A1 | 2/2004 | Krickau et al. | 25/250.32 |
| 2004/0098821 A1 | 5/2004 | Kraemer et al. | 15/250.201 |
| 2004/0117978 A1 | 6/2004 | Christian et al. | 15/250.32 |
| 2005/0039292 A1 | 2/2005 | Boland et al. | 15/250.32 |

FOREIGN PATENT DOCUMENTS

| | | | |
|---|---|---|---|
| JP | 2005-75240 | * | 3/2005 |
| JP | 2005-119453 | * | 5/2005 |

* cited by examiner

*Primary Examiner*—Gary K Graham
(74) *Attorney, Agent, or Firm*—Bacon & Thomas, PLLC

(57) ABSTRACT

The present invention is to provide a joint apparatus of car windshield wiper arm, which comprises a upper cover body and a chassis; wherein said upper cover body having a round groove cut with V-shaped cross-section is concaved near the bottom side of the front side; a guiding gap is concaved between said front top surface and said rear top surface; a horizontal round groove receptacle and a vertical hollow socket are respectively created at said guiding gap; a horizontal elastic embed hook is built at the center between said rear side; and said chassis having a pair of parallel and symmetrical left plate and right plate are upwards built at the front section, and a horizontal fixing pivot is bridged near the front end; an upright curbing plate is upwards formed in the middle section of the bottom plate; a insetting hole is perforated at the center of the rear plate. By means of the round groove cut of the upper cover body and the fixing pivot on the chassis being intimately engaged each other to serve as a pivot, as well as the horizontal elastic embed hook of the upper cover body and the insetting hole on the chassis being inset each other respectively, thus, the insetting securely in rigging assembly or the dismantling in replacement of wiper arm with curbing head to or from between the joint apparatus of the wiper can be quickly accomplished.

1 Claim, 12 Drawing Sheets

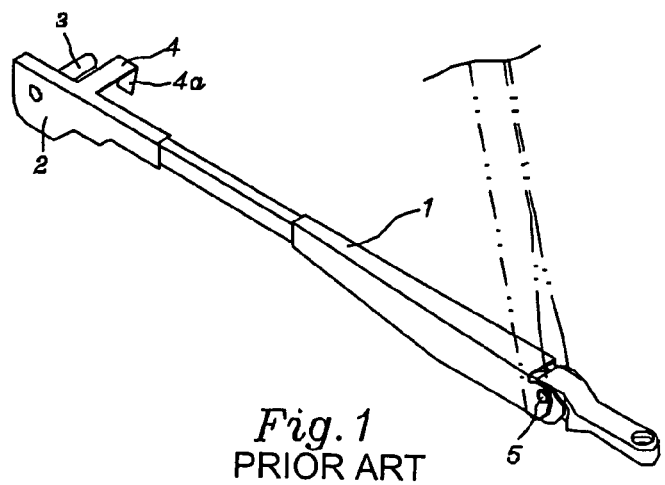
Fig. 1
PRIOR ART
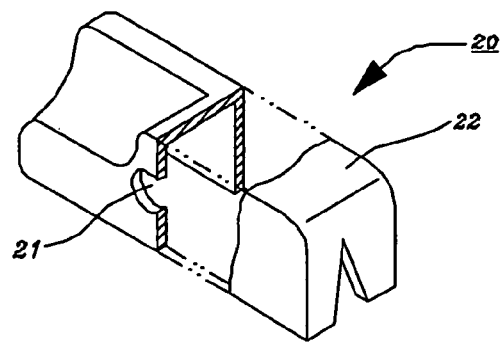
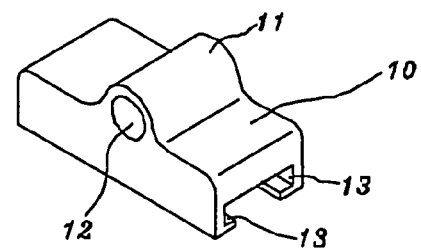
Fig. 2
PRIOR ART

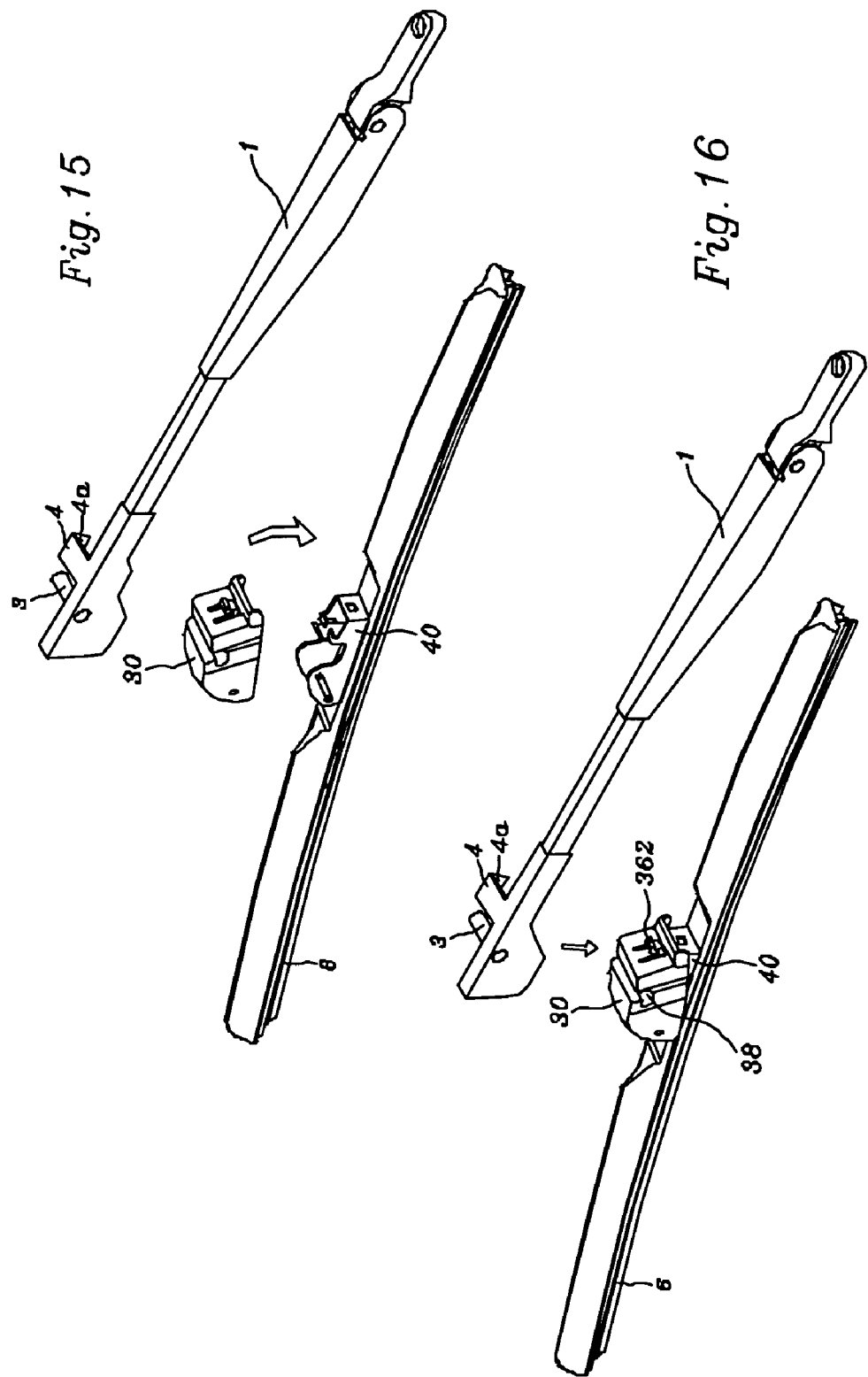

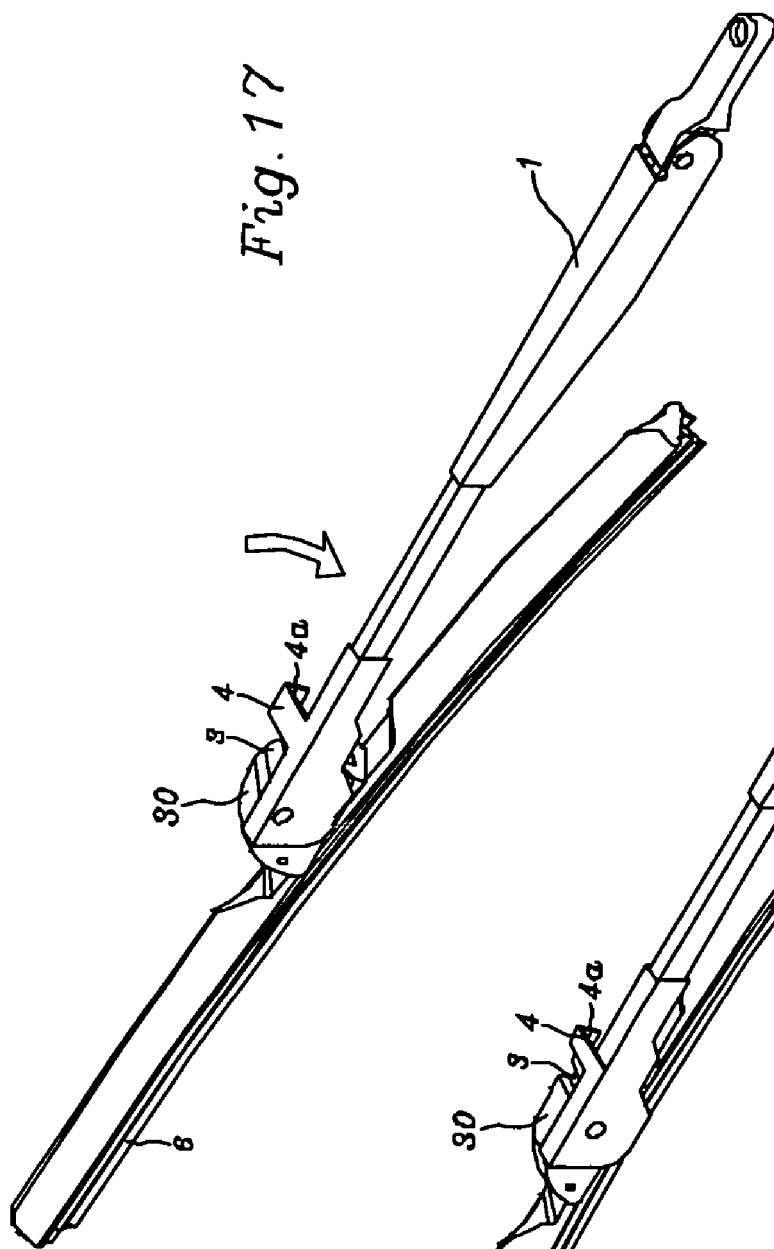
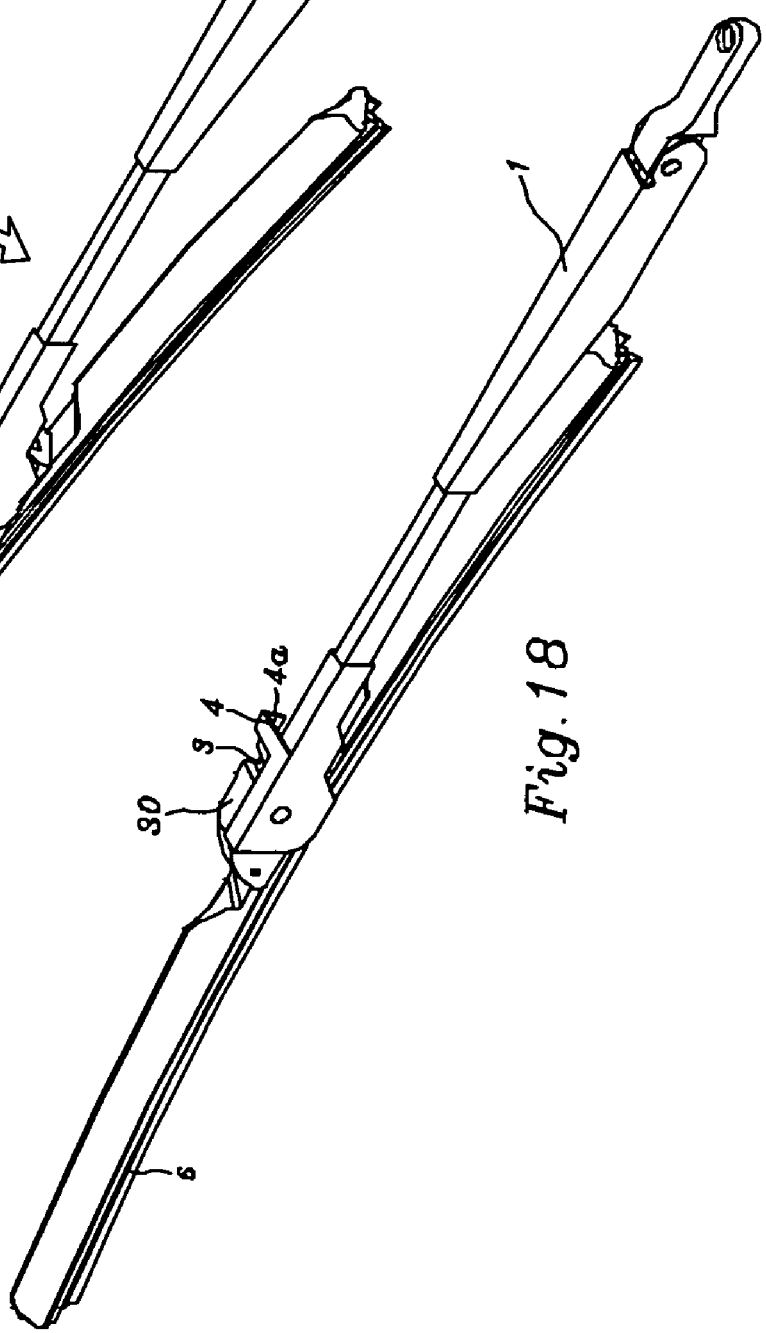

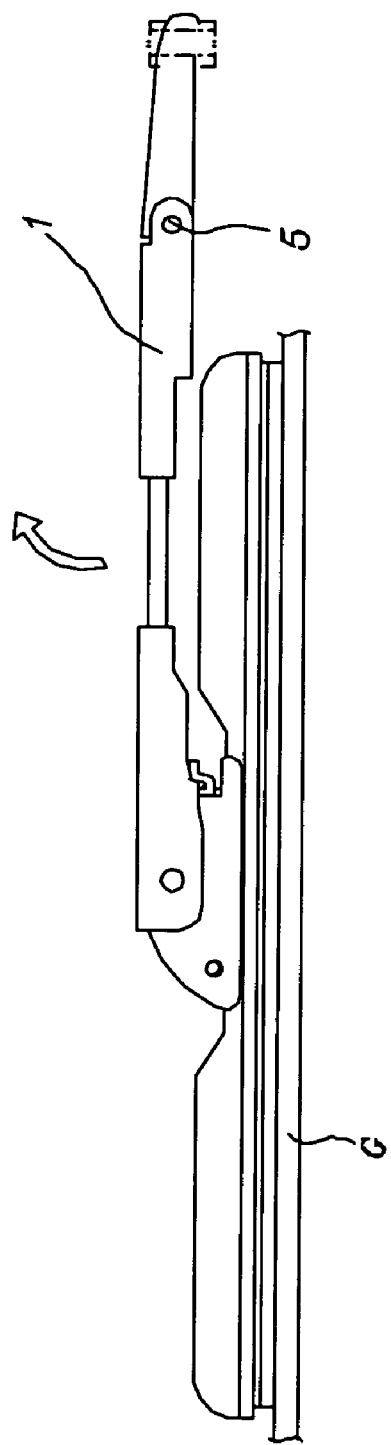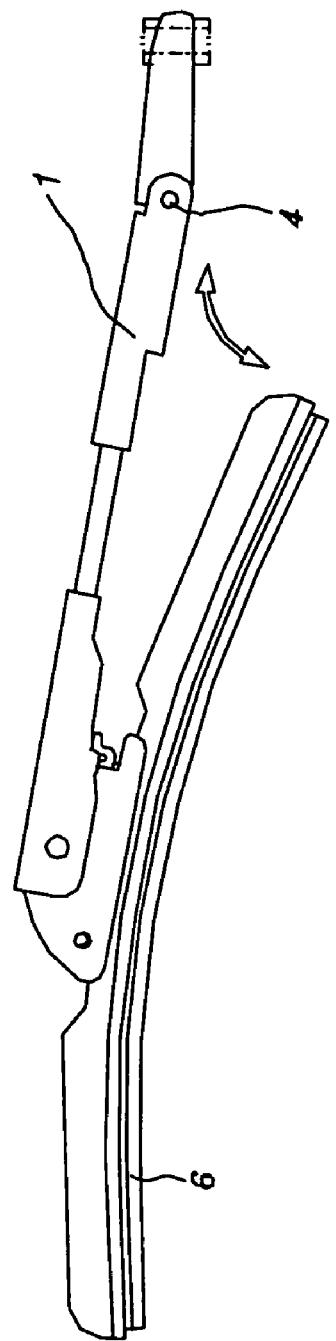

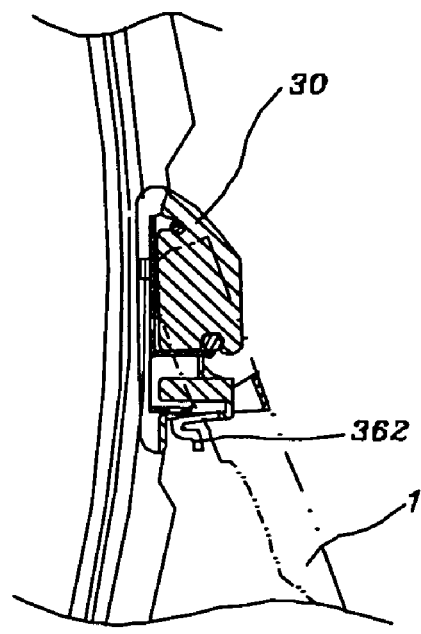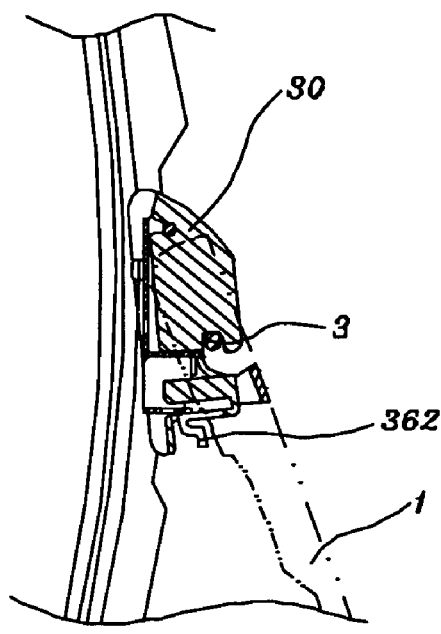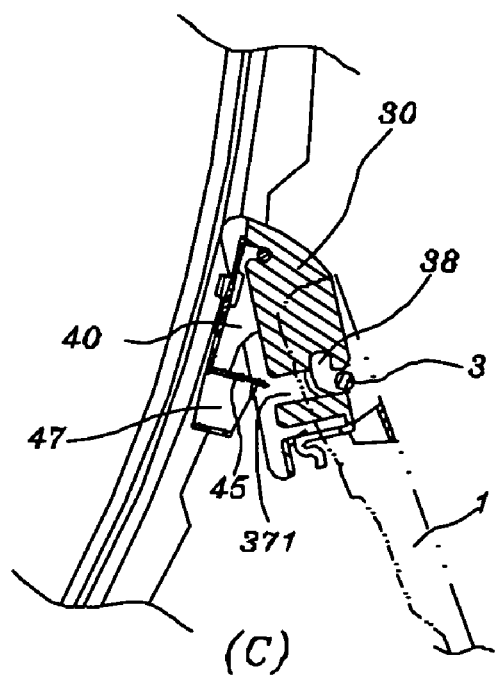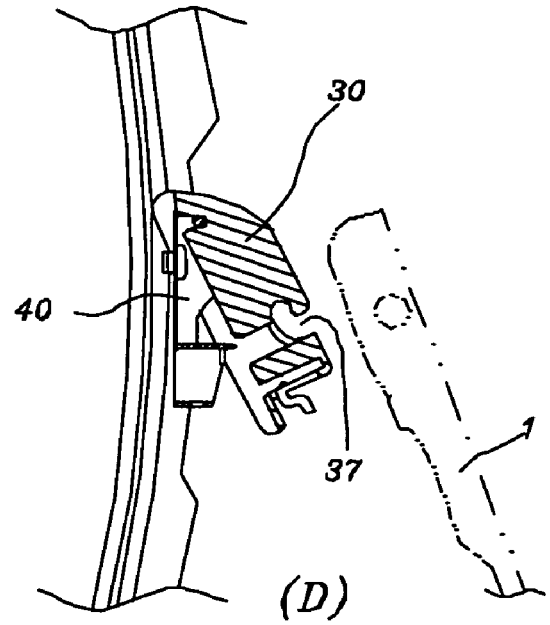
Fig.22

JOINT APPARATUS OF A CAR WINDSHIELD WIPER ARM

FIELD OF THE PRESENT INVENTION

The present invention relates to a joint apparatus of car windshield wiper arm, more particularly being contrived for the curbing-type wiper arm with fixing spindle and press curbing strip. Hence, it not only satisfies with the demand of fixing and curbing press but also provides the more quick and simpler operation effect. Thus, the operation of replacing worn wiper by new one becomes fast, rapid and easy and smooth.

BACKGROUND OF THE PRESENT INVENTION

Presently, the types in head of windshield wiper arm are many in variety. Different type design of wiper arm head must be coordinated with its exclusive joint apparatus to enable securely joint each other. Such as USA issued patents U.S. Pat. Nos. 6,516,491, 6,687,948, 6,782,581, 6,836,927, 6,836,926 and U.S. Pat. No. 6,910,244 as well as USA published patents US2004/0025280, US2005/0039292, US2004/0098821 and US2004/0117938, all disclosed their different types of wiper arm head in association with its exclusive joint apparatus; In which, a conventional wiper arm disclosed in USA published patents US2004/0117938 is shown in the FIG. 1, FIG. 3 through FIG. 7. A fixing spindle 3 and a press curbing strip 4 are erected on one lateral side of the head 2 in parallel and front-and-rear juxtaposed manner; said press curbing strip 4 is formed by sidewise projecting the top surface of said head 2 horizontally, then bends its end to become a downwards curbing tongue 4a; said fixing spindle 3 is slightly lower than said press curbing strip 4 with adequate space. Refer to FIG. 2 to FIG. 6, the exclusively coordinated joint apparatus of said wiper arm 1 with said curbing head 2 comprises a main body 10 and a upper canopy 20; wherein, said main body 10 is a cuboid with a bulging hump 11 being raised in the center of its top surface, a spindle hole 12 is perforated through both sides of said bulging hump 11, a pair of parallel and symmetrical insetting clip 13 is inwards built at the bottom side of said main body 10, both of said insetting clip 13 and said spindle hole 12 are arranged in perpendicular manner; said upper canopy 20 is a rectangular cannulation with opening directly jacketing said main body 10 and with a round hole 21 perforated on one long lateral side, the center of said round hole 21 is superimposed with that of said spindle hole 12 on said main body 10.

The rigging assembly of said wiper arm 1 with said curbing head 2 and windshield wiper is shown in the FIG. 3 through FIG. 7, First, by means of said insetting clip 13, employ said main body 10 to clamp the central position in the elastic metal strip 7 of said wiper 6, then make said upper canopy 20 to jacket said main body 10 (as shown in A-A sectional view of the FIG. 7) so that all three elements of said upper canopy 20, said main body 10 and said wiper 6 are closely jointed together as a unitary body; Afterwards, first overturn said upper canopy 20 into vertical status and let its round hole 21 align with the center in said fixing spindle 3 of said wiper arm 1 (as shown in the FIG. 4), then insert said fixing spindle 3 into said round hole 21 of said upper canopy 20 due to the distance between said top surface 22 of said upper canopy 20 and said round hole 21 is less than that of said fixing spindle 3 on said curbing head 2 and said press curbing strip 4, said fixing spindle 3 can be smoothly inserted into said round hole 21 of said upper canopy 20 without any interference from said curbing tongue 4a at the end of said press curbing strip 4 up to the free end of said fixing spindle 3 passes through said spindle hole 12 on said main body 10 and adherent rest to the other inner wall of said upper canopy 20 (as shown in the FIG. 5); Lastly, overturn said upper canopy 20 again to resume back into its original horizontal status (as shown in the FIG. 6) such that said press curbing strip 4 and said curbing tongue 4a on the side of said curbing head 2 contact the top surface 22 of said upper canopy 20 and its other lateral side (as shown in the FIG. 7), thus said upper canopy 20 and said main body 10 are confined to said curbing tongue 4a at the end of said press curbing strip 4 so that said wiper 6 is unlikely to disjoint off said wiper arm 1.

However, during practical operation of replacing worn windshield wiper by new one, there are some drawbacks of aforementioned joint apparatus as below:

1. Refer to FIG. 8 and FIG. 9, for said wiper arm 1 with said curbing head 2:

during the replacement of new windshield wiper, an upwards force must be first applied on said wiper arm 1, which tightly stays with the windshield G in horizontal position (as shown in the FIG. 8); Exploit pivot of said elastic foldable articulation 5, said wiper arm 1 is folded in upright position to enable the wiper 6 depart away from windshield G (as shown in FIG. 9); Then, the dismantling procedure of said worn wiper 6 can be start to proceed; As described above, in order to let said upper canopy 20 get rid of the confinement by said curbing tongue 4a at the end of said press curbing strip 4, said integral wiper 6 must be overturned 90 degree angle such that being able to draw out of said fixing spindle 3; Said wiper 6 under such acting operation always hit the replacing operator during overturn of said wiper 6; More than that, said wiper 6 will unexpectedly re-bounce back to resume its original horizon status under inadvertently touch said curbing head 2 of said wiper arm 1 by hand due to any carelessness, thus serious drawback of hurt the windshield G will happen in accompanied consequence of said curbing head 2 directly strike the surface of said windshield G.

2. Refer to FIG. 4 and FIG. 5, before operation of rigging assembly or dismantling said wiper 6:

Said upper canopy 20 on said wiper 6 must always be overturned to perpendicular to said curbing head 2 each other under double confinement of said fixing spindle 3 on said curbing head 2 and said curbing tongue 4a on said press curbing strip 4 (as shown in the FIG. 5); Furthermore, other than said fixing spindle 3 must be alignment with said round hole 21 on said upper canopy 20, the applying force must keep parallel all the way during procedure of inserting of drawing out of said spindle hole 12 on said main body 10 (as shown in the FIG. 4), otherwise the difficulty of inserting of drawing will increases due to any unbalance; Therefore, the operation of rigging assembly or dismantling said wiper 6 seems difficult and time-wasting so that not being satisfied with the basic demand of simple and easy operation conversely, thus the structure of said main body 10 and said upper canopy 20 is definitely a bad contrivance.

SUMMARY OF THE PRESENT INVENTION

The main object of the present invention is to provide a joint apparatus of car windshield wiper arm, which comprises a upper cover body and a chassis; Exploiting the round groove cut of the upper cover body and the fixing pivot on the chassis being intimately engaged each other to serve as a pivot, as well as the guiding gap and the horizontal elastic embed hook of the upper cover body and the insetting hole on the chassis being inset each other, hence, the rigging assembly and dismantling of said wiper arm with curbing head and said wiper can be rapidly and time-saving accomplished.

The other object of the present invention is to provide a joint apparatus of car windshield wiper arm: During the operation procedure of replacing worn wiper blade by new one, not only the effort-wasting in alert to the alignment of fixing spindle with spindle hole can be saved, but also said wiper needless to overturn, hence it will not hit the replacing operator or not unexpectedly re-bounce back to resume its original horizon status under inadvertently touch said curbing head of said wiper arm by hand due to any carelessness, thus serious drawback of hurt the windshield G in accompanied consequence of said curbing head directly strike the surface of said windshield G can be avoided.

BRIEF DESCRIPTION OF THE DRAWINGS

FIG. 1 is the 3-D illustrative view of the conventional wiper arm with curbing head.

FIG. 2 is the 3-D view in decomposition of the conventional wiper arm with curbing head in association with its exclusive joint apparatus.

FIG. 15 is the first 3-D illustrative view in assembly of the present invention and the conventional wiper arm with curbing head.

FIG. 16 is the second 3-D illustrative view in assembly of the present invention and the conventional wiper arm with curbing head.

FIG. 17 is the third 3-D illustrative view in assembly of the present invention and the conventional wiper arm with curbing head.

FIG. 18 is the fourth 3-D illustrative view in assembly of the present invention and the conventional wiper arm with curbing head.

FIG. 20 is the first operation illustrative view of the present invention in combination with the windshield wiper and conventional wiper arm with curbing head.

FIG. 21 is the second operation illustrative view of the present invention in combination with the windshield wiper and conventional wiper arm with curbing head.

FIG. 22 is the illustrative view of the present invention in dismantling step from the conventional wiper arm with curbing head.

DETAILED DESCRIPTION OF THE PREFERRED EMBODIMENTS

Figures 3, 4:
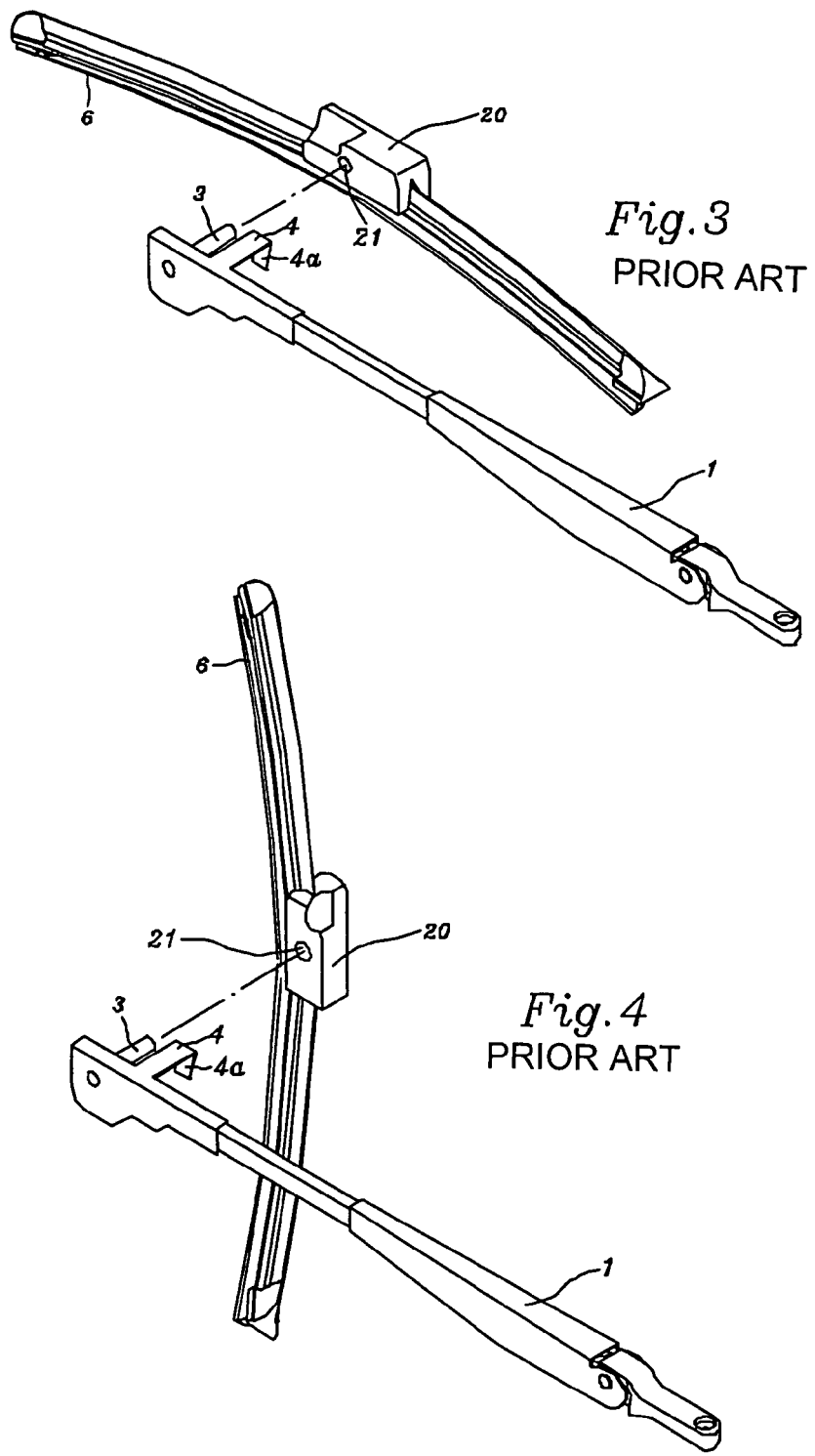
FIG. 3 is the first 3-D illustrative view in assembly of the conventional wiper arm with curbing head in association with its exclusive joint apparatus.
FIG. 4 is the second 3-D illustrative view in assembly of the conventional wiper arm with curbing head in association with its exclusive joint apparatus.
Figure 5:
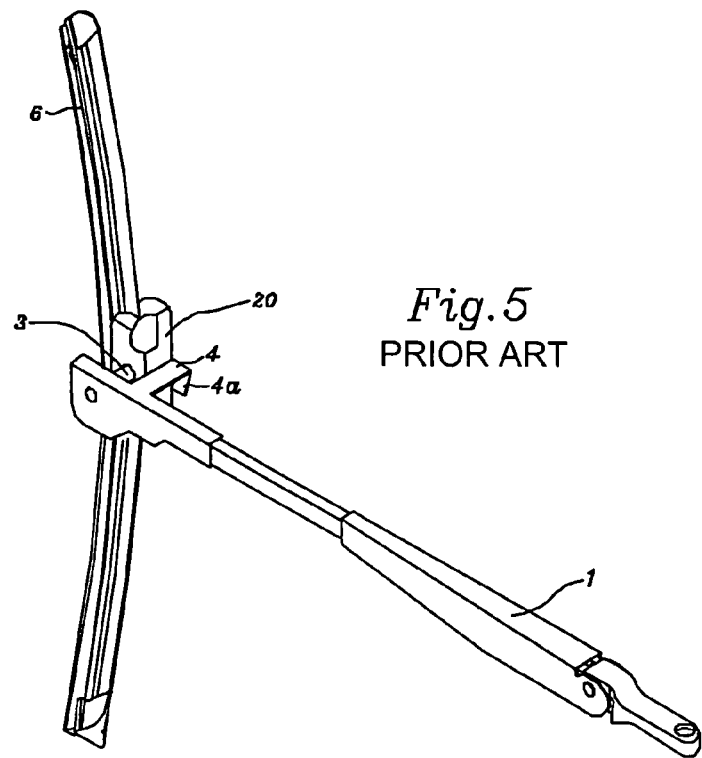
FIG. 5 is the third 3-D illustrative view in assembly of the conventional wiper arm with curbing head in association with its exclusive joint apparatus.
Figure 6:
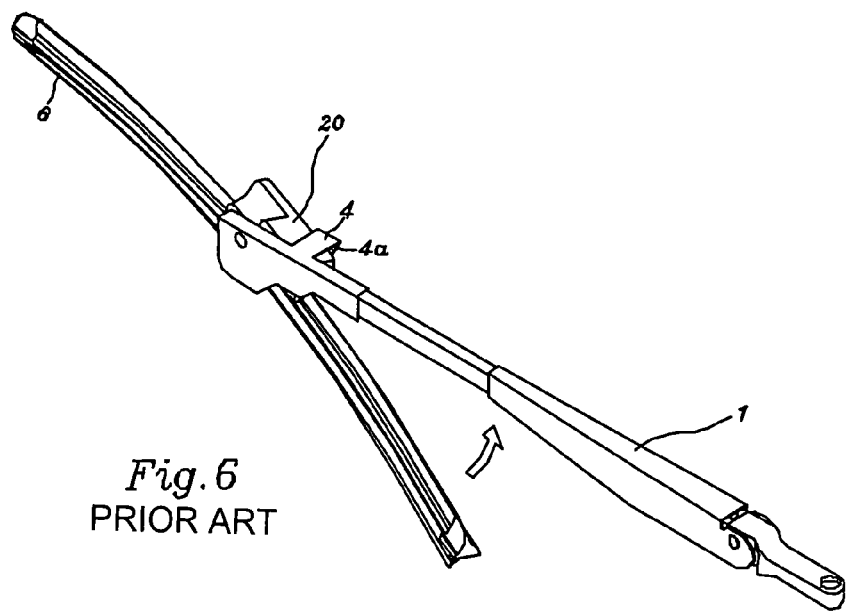
FIG. 6 is the fourth 3-D illustrative view in assembly of the conventional wiper arm with curbing head in association with its exclusive joint apparatus.
Figure 7:
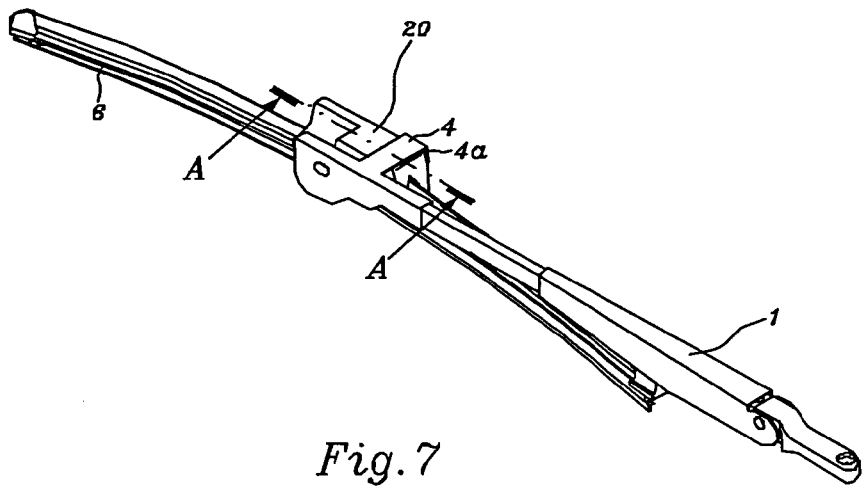
FIG. 7 is the fifth 3-D illustrative view in assembly of the conventional wiper arm with curbing head in association with its exclusive joint apparatus.
Figure 7A:
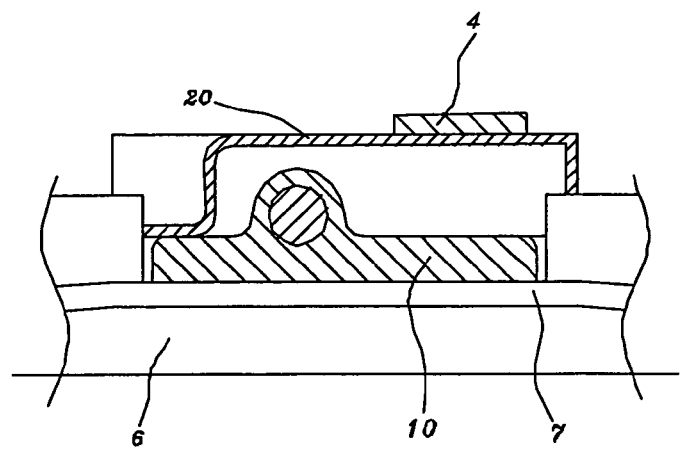
FIG. 7A is a cross sectional view of the portion taken on line A-A of FIG. 7.
Figure 8:
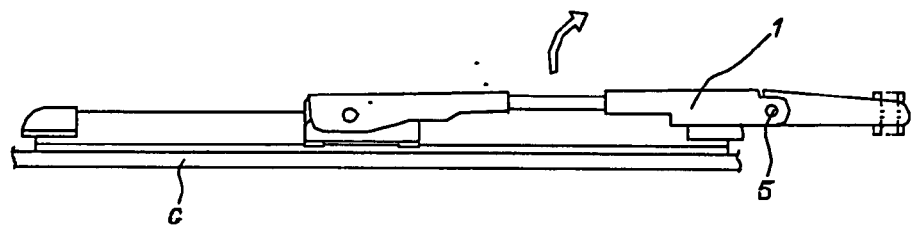
FIG. 8 is the first operation illustrative view of the conventional wiper arm with curbing head and its exclusive joint apparatus in the combination with windshield wiper.
Figure 9:
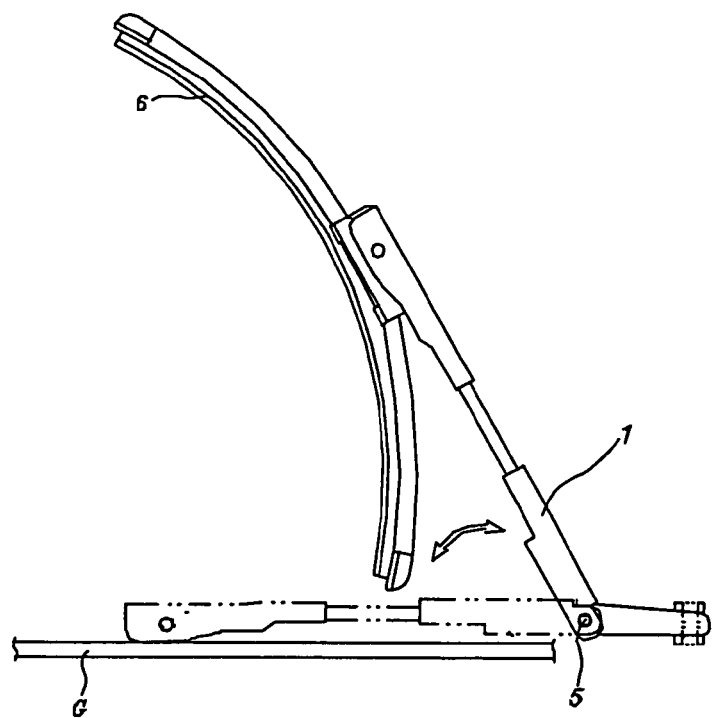
FIG. 9 is the second operation illustrative view of the conventional wiper arm with curbing head and its exclusive joint apparatus in the combination with windshield wiper.
Figures 10, 11, 12:
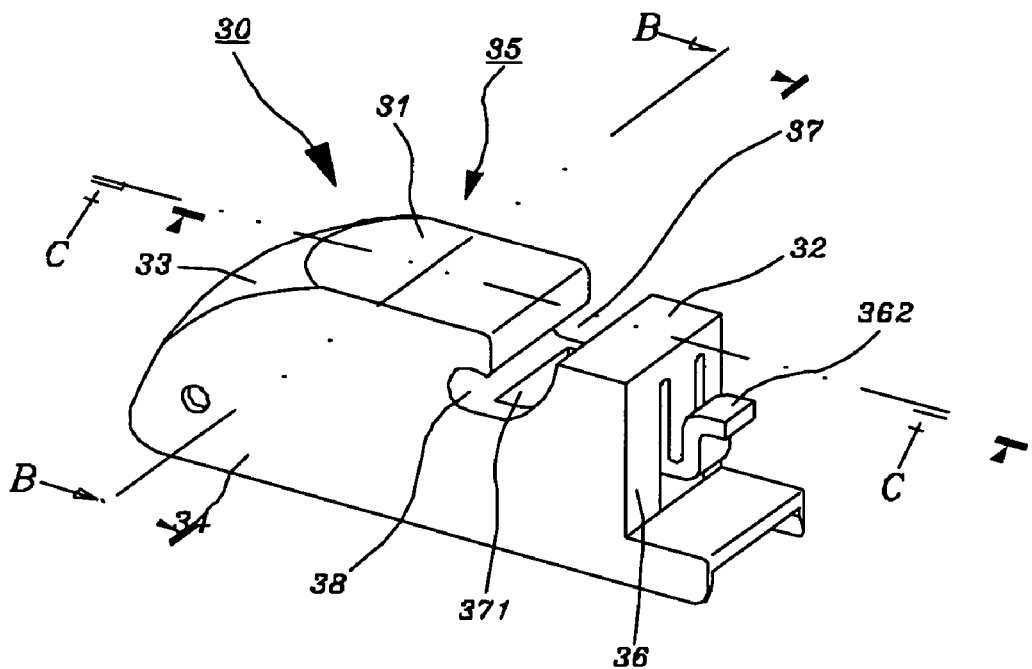
FIG. 10 is the 3-D view of the upper cover body of the present invention.
FIG. 11 is the cross-sectional view of the portion taken on line of B-B of FIG. 10.
FIG. 12 is the cross-sectional view of the portion taken on line of C-C of FIG. 10.
Figure 13:
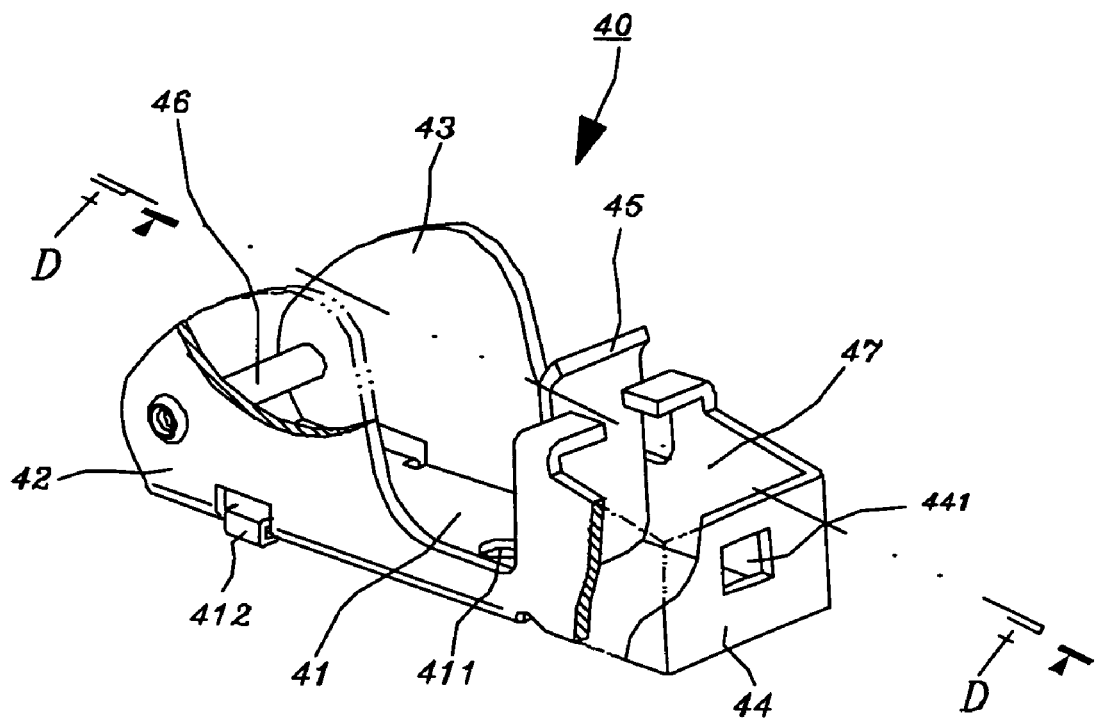
FIG. 13 is the 3-D view of the chassis of the present invention.
Figure 14:
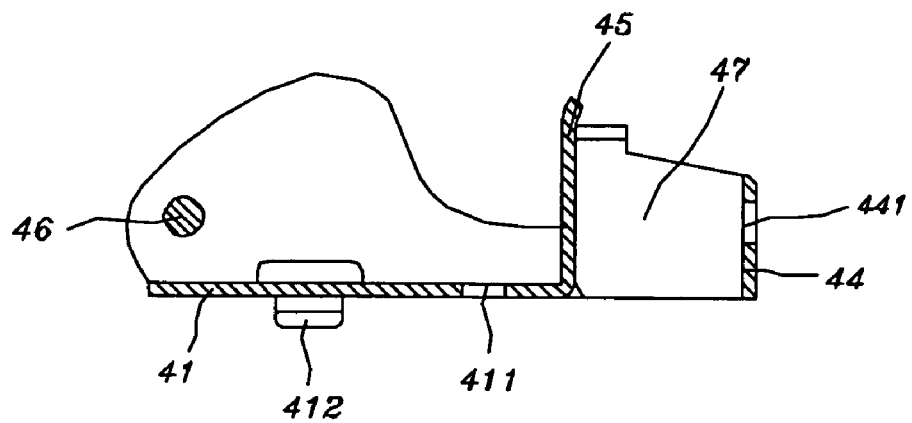
FIG. 14 is the cross-sectional view of the portion taken on line of D-D of FIG. 13.
Figure 19:
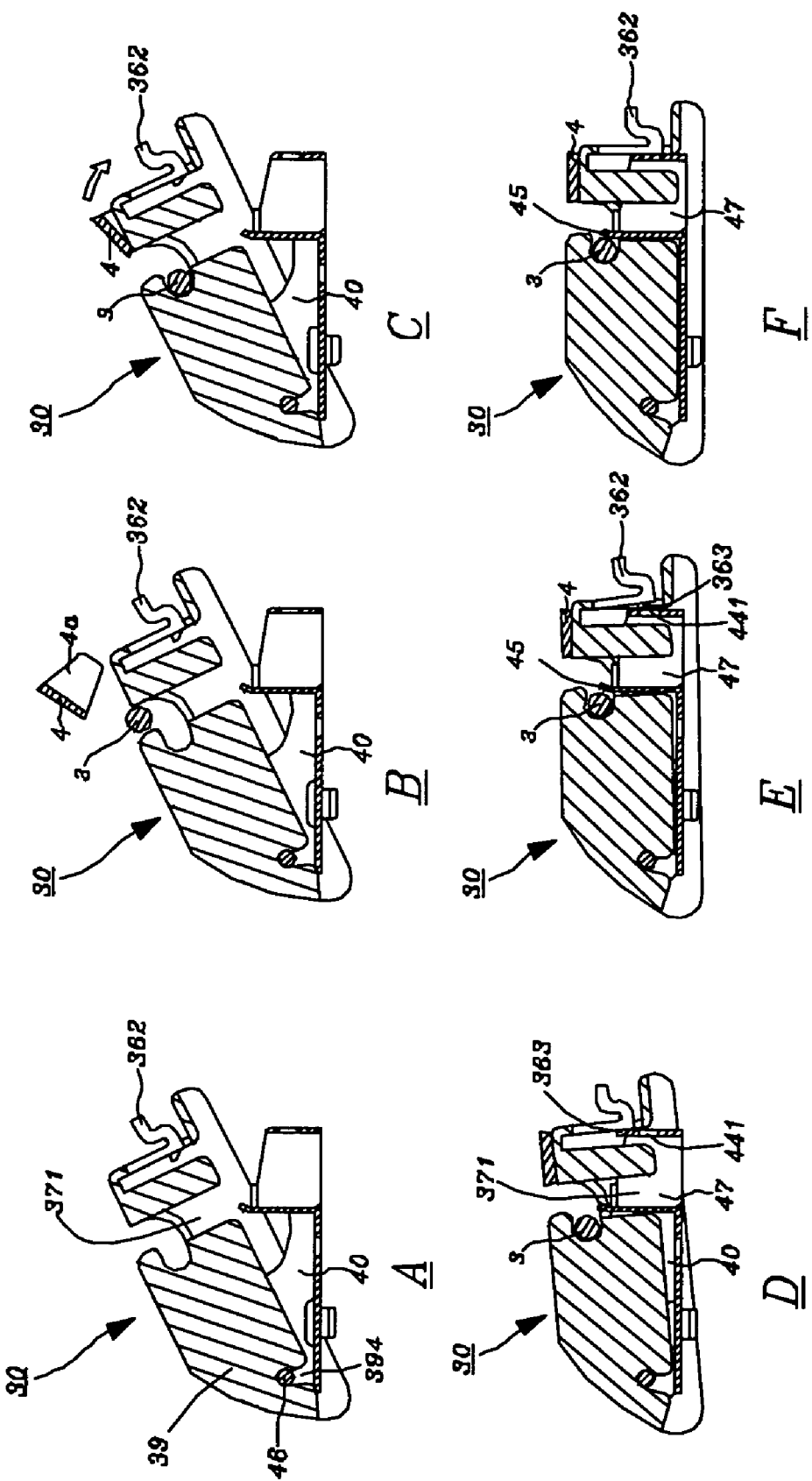
FIG. 19 is the illustrative view of the present invention in buckle engagement action of the upper cover body with chassis.

Referring to FIG. 10 through FIG. 14, the present invention "joint apparatus of car windshield wiper arm" comprises:

an upper cover body 30, which comprises a front top surface 31, a rear top surface 32, a front side 33, a left side 34, a right side 35 and a rear side 36, wherein a guiding gap 37, which is concaved between said front top surface 31 and said rear top surface 32, has a adjacent round groove receptacle 38 indented at its bottom portion towards said front top surface 31; said front side 33 and said front top surface 31 joint internally together to make a solid core 39 inside (as shown in the FIG. 12); some distance exists between both sides upright of the bottom side 391 of said core 39 and said left side 34 as well as said right side 35 for creating each left groove cut 392 and right groove cut 393 respectively (as shown in the FIG. 11); a round groove cut 394 with V-shaped cross-section is concaved near said front side 33; a back-end face 395 is upwards created by extending the bottom side 391 of said core 39 backwards some distance then bending vertical up in junction with the bottom section of said guiding gap 37 (as shown in the FIG. 12); an erecting face 321 is formed at the center in front edge joint of said rear top surface 32 and said guiding gap 37, so that the space between said erecting face 321 and said back-end face 395 of said core 39 encompasses a hollow socket 371 at the central bottom of said guiding gap 37; said left side 34 and said right side 35 backwards joint with said rear side 36 respectively, and an erecting hollow groove 361 is indented inside of said rear side 36, wherein a horizontal elastic embed hook 362 is built at the center between said rear side 36 and said erecting hollow groove 361, and a horizontal insetting nose 363 is raised at the central wall of said erecting hollow groove 361 (as shown in the FIG. 12); and a chassis 40, which comprises a bottom plate 41, a left plate 42, a right plate 43 and a rear plate 44; wherein, a fixing hole 411 is perforated at the center of said bottom plate 41; a pair of parallel and symmetrical insetting clip 412 is concaved between said fixing hole 411 and front edge of said bottom plate 41; the elastic metal strip 7 can be securely infixed with said chassis 40 by means of rivet through said fixing hole 411 together with said two insetting clip 412 so that no displacement or detachment; and, said left plate 42 and right plate 43 are upwards built at both sides of said bottom plate 41 in parallel and symmetrical pair; an upright curbing plate 45 is formed by bending the rear end of said bottom plate 41 upwards (as shown in the FIG. 13); a horizontal fixing pivot 46 is bridged between said left plate 42 and said right plate 43 near the front end; an upright hollow plug 47 is encompassed by extending middle section of said left plate 42 and said right plate 43 backwards in joint with said rear plate 44; a insetting hole 441 is perforated at the center of said rear plate 44 to let buckle engagement of said insetting nose 363 at said horizontal elastic embed hook 362 of said upper cover body 30 (as shown in the FIG. 19).

Refer to FIG. 15 through FIG. 19, they are the rigging assembly way and step of the present invention with the conventional said wiper arm 1 with said curbing head 2. First, align said round groove cut 394 on the said core 39 of said upper cover body 30 with said fixing pivot 46 of said chassis 40, and apply force to let them engage each other in order to become a pivot (as shown in A view of the FIG. 19); Subsequently, without any special attention, said fixing spindle 3 on said curbing head 2 of said wiper arm 1 can be quickly aligned with and downwards insert said guiding gap 37 on said upper cover body 30, then passing through said guiding gap 37 to inset into said round groove receptacle 38 (as shown in the FIG. 16, B view and C view of the FIG. 19); Finally, apply force downwards until the snap sound of said insetting nose 363 on said horizontal elastic embed hook 362 of said upper cover body 30 slipping into said insetting hole 441 of said chassis 40 to make sure the finish of rigging joint between said wiper arm 1 and said wiper 6 (as shown in the FIG. 18).

Refer to FIG. 19, the detailed steps of buckling engagement between said upper cover body 30 and said chassis 40 are broken down below:

First, due to contact pressure from said press curbing strip 4 being applied on said rear top surface 32 on said upper cover body 30 (as shown in C view of the FIG. 19), said integral upper cover body 30 is forced to approach said chassis 40 (as shown in C view of the FIG. 19);

After said hollow socket 371 on said upper cover body 30 being inserted by said hollow plug 47 on said chassis 40, the top edge of said rear plate 44 on said chassis 40 gradually touches said insetting nose 363 on said horizontal elastic embed hook 362; Synchronously, said upright curbing plate 45 on said chassis 40 also put into said hollow socket 371 on said upper cover body 30 (as shown in D view of the FIG. 19); Under continuous downwards pressure from said press curbing strip 4, said horizontal elastic embed hook 362 will be deformed (as shown in E view of the FIG. 19); Eventually, after said insetting nose 363 on said horizontal elastic embed hook 362 wholly inset said insetting hole 441 on said rear plate 44, said upper cover body 30 and said chassis 40 are intimately jointed together totally; Simultaneously, said upright curbing plate 45 on said chassis 40 entirely blocks said the opening of said round groove receptacle 38 and confines said fixing spindle 3 such that being unable to depart off and get into the bottom portion of said guiding gap 37, hence being unable to separate off said upper cover body 30; thus the firm joint between said wiper arm 1 and said wiper 6 is accomplished.

Refer to FIG. 20 through FIG. 22, when apply the present invention to dismantle worn wiper for substitute new one, the process can be proceed needless to apply any upwards force on said wiper arm 1, which tightly stays on the windshield G horizontally, to fold it into vertical status; Said curbing head 2 on said wiper arm 1 only need to lift slightly higher than the top surface of said upper cover body 30 of said wiper 6 (as shown in the FIG. 21), said horizontal elastic embed hook 362 can be deformed by force from operator's hand through space between said wiper arm 1 and upper cover body 30 (as shown in A view of the FIG. 22); Furthermore, said insetting nose 363 on said horizontal elastic embed hook 362 will separate off said insetting hole 441 such that said upper cover body 30 will gradually depart off said chassis 40 (as shown in B view of the FIG. 22); Said upright curbing plate 45 will not block the opening of said round groove receptacle 38 when said hollow plug 47 completely separates off said hollow socket 371 (as shown in C view of the FIG. 22); Hence, said fixing spindle 3 on said curbing head 2 can be removed out of said round groove receptacle 38 on said upper cover body 30, thus rapidly and easily pull out of said guiding gap 37 to completely depart off said upper cover body 30 (as shown in D view of the FIG. 22). Therefore, serious drawback of hurt the windshield G in consequence of unexpectedly re-bounce back to resume its original horizon status ca be avoided; Moreover, during the operation procedure of replacing worn wiper blade by new one, not only the effort-wasting in alert to the alignment of fixing spindle with spindle hole can be saved, but also said wiper needless to overturn, hence it will not hit the replacing operator; Thus, the operation of replacing worn wiper by new one becomes fast, rapid and easy and smooth so that totally satisfies with the demand of simplicity, easiness and safety.

What is claimed is:

1. A joint apparatus of car windshield wiper arm, comprising:

an upper cover body, which comprises a front top surface, a rear top surface, a front side, a left side, a right side and a rear side, wherein a guiding gap, which is concaved between said front top surface and said rear top surface, has a adjacent round groove receptacle indented at its bottom portion towards said front top surface; said front side and said front top surface joint internally together to make a solid core inside; a distance exists between both sides upright of a bottom side of said core and said left side as well as said right side for creating a left groove cut and a right groove cut, respectively; a round groove cut with V-shaped cross-section is concaved near said front side; a back-end face is upwards created by extending the bottom side of said core backwards some distance then bending vertical up in junction with the bottom section of said guiding gap; an erecting face is formed at a center in a front edge joint of said rear top surface and said guiding gap, so that the space between said erecting face and said back-end face of said core encompasses a hollow socket at the central bottom of said guiding gap; said left side and said right side joint with said rear side respectively, and an erecting hollow groove is indented inside of said rear side, wherein a horizontal elastic embed hook is built at the center between said rear side and said erecting hollow groove, and a horizontal insetting nose is raised at a central wall of said erecting hollow groove; and a chassis having a bottom plate, a left plate, a right plate and a rear plate; wherein, a fixing hole is perforated at the center of said bottom plate; a pair of parallel and symmetrical inset clips is concaved between said fixing hole and front edge of said bottom plate; said left plate and right plate are extending upwards at both sides of said bottom plate in parallel and symmetrical pair; an upright curbing plate is formed by bending the rear end of said bottom plate upwards; a horizontal fixing pivot is bridged between said left plate and said right plate near the front end; an upright hollow plug is encompassed by extending middle section of said left plate and said right plate backwards in joint with said rear plate; and an insetting hole is perforated at the center of said rear plate.

* * * * *